Feb. 25, 1936.   C. C. FARMER ET AL   2,032,119
FLUID PRESSURE BRAKE
Filed May 8, 1931   2 Sheets-Sheet 2

INVENTORS
CLYDE C. FARMER
AND
ELLIS E. HEWITT
By Wm. M. Cady
ATTORNEY.

Patented Feb. 25, 1936

2,032,119

UNITED STATES PATENT OFFICE 2,032,119

FLUID PRESSURE BRAKE

Clyde C. Farmer, Pittsburgh, and Ellis E. Hewitt, Edgewood, Pa., assignors to The Westinghouse Air Brake Company, Wilmerding, Pa., a corporation of Pennsylvania Application May 8, 1931, Serial No. 535,956

15 Claims. (Cl. 303—39)

This invention relates to fluid pressure brakes and more particularly to an automatic fluid pressure brake system in which the brakes are applied upon effecting a reduction in brake pipe pressure and are released upon effecting an increase in brake pipe pressure.

There is a continuing tendency to increase the length of freight trains and with the consequent increase in the length of the brake pipe, the operating difficulties in the control of the brakes are correspondingly increased.

One such difficulty arises from the increased time required to obtain approximately the full working pressure in the fluid pressure brake system throughout the length of a very long train to insure the prompt release of the brakes on the train.

In initially charging the fluid pressure brake system on a very long train, another such difficulty arises from the increased time required to obtain sufficient pressure in the system to render it safe to put the train in motion.

The principal object of our invention is to provide an improved fluid pressure brake equipment which will operate to promptly control the brakes and which will materially reduce the time required to initially charge the system to a safe working pressure.

Another object of our invention is to provide a fluid pressure brake equipment having means operative in effecting an application of the brakes for initially venting fluid under pressure from the brake pipe to a single chamber and finally venting fluid under pressure from the brake pipe to said chamber at a restricted rate and to another chamber at a faster rate.

A further object of our invention resides in the provision of means for rendering the local reduction in brake pipe pressure, caused by the initial local venting of fluid under pressure from the brake pipe, effective in the brake pipe before it is effective in the brake application valve device, thus insuring the rapid transmission of quick service action from one car to the following car.

Other objects and advantages will appear in the following more detailed description of the invention.

Figure 1:
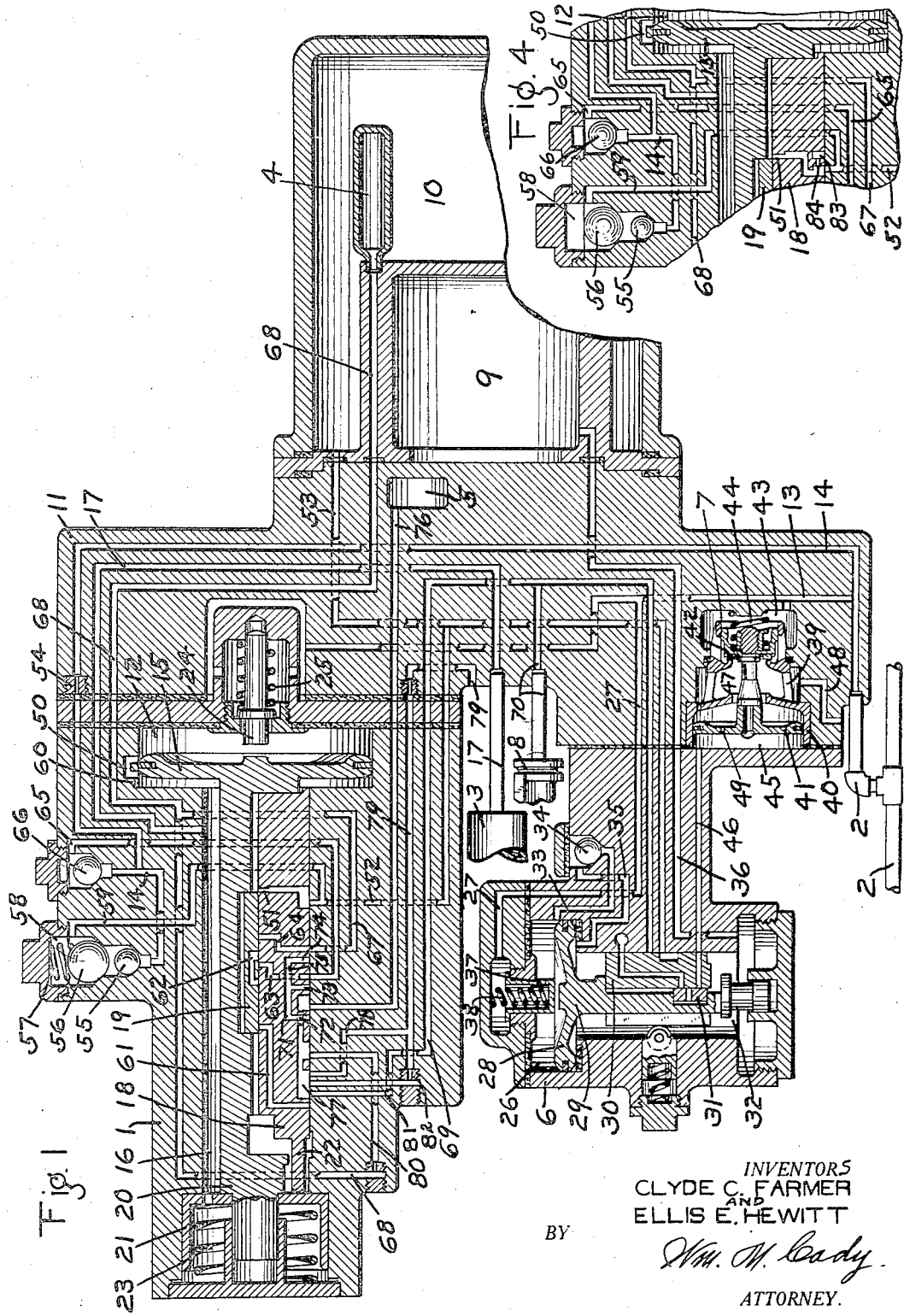
Figure 2:
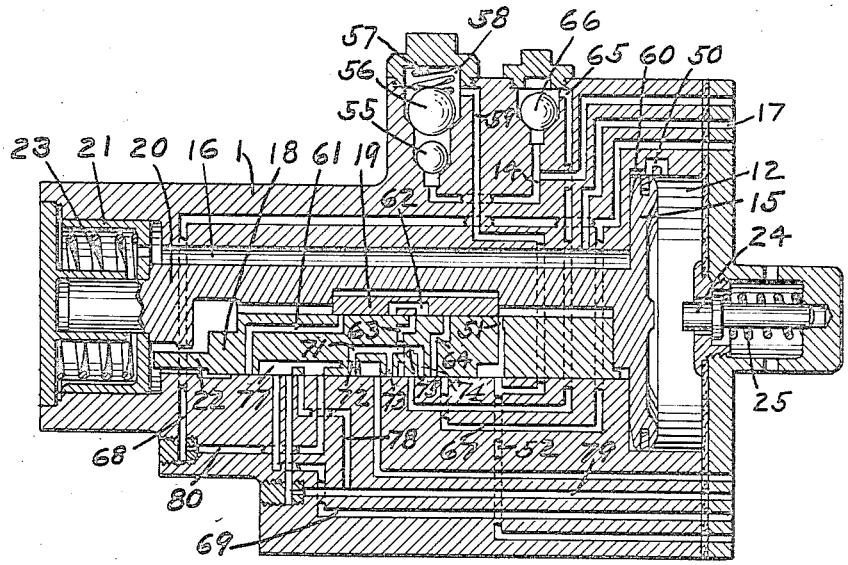
Figure 3:
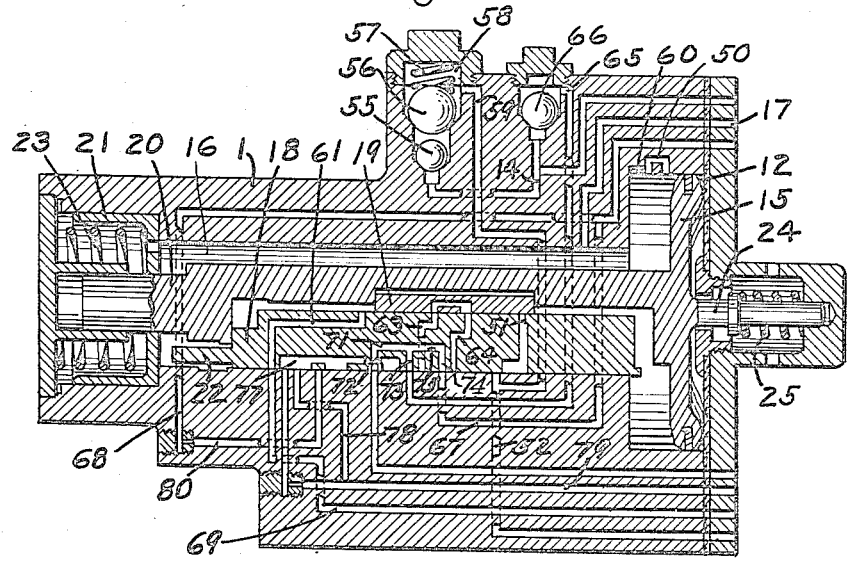

In the accompanying drawings; Fig. 1 is a diagrammatic sectional view of a fluid pressure brake equipment embodying the invention, the several parts of the equipment being shown in full release position; Figs. 2 and 3 are diagrammatic sectional views of the application valve device showing the several parts of the device in retarded release position and service position, respectively; and Fig. 4 is a diagrammatic sectional view of a portion of the application valve device and illustrates a modification of the invention.

As shown in the drawings, the fluid pressure brake equipment may comprise a triple valve device 1, a brake pipe 2, an auxiliary reservoir 3, chambers 4 and 5 into which, under certain conditions as will hereinafter appear, fluid under pressure is vented from the brake pipe, an emergency valve device 6, a vent valve device 7, a brake cylinder 8, a quick action reservoir 9 and an emergency reservoir 10.

The triple valve device 1 comprises a casing which is secured to a pipe bracket 11 and which has a piston chamber 12 connected to the brake pipe 2 by way of a passage 13 and a passage 14 and containing a piston 15 and having a valve chamber 16 connected to the auxiliary reservoir 3 through a passage and pipe 17 and containing a main slide valve 18 and a graduating slide valve 19 mounted on and having a movement relative to the main slide valve, said valves being operated by said piston through the medium of a piston stem 20.

The triple valve device is of the retarded release type, and consequently is provided with a retarded release stop 21 which is adapted to engage the rear end of the piston stem 20 and also engage a lug 22 projecting rearwardly from the main slide valve 18. Movement of the stop 21, by the piston stem 20, is opposed by the action of a coil spring 23.

The piston 15, upon its movement to full service position, engages a movable stop 24, subject to the pressure of a coil spring 25.

The emergency valve device 6 comprises a casing which is secured to the pipe bracket 11 and which has a piston chamber 26 connected to the brake pipe 2 through a passage 27, and the passages 13 and 14 and contains a piston 28 having a stem 29 which is adapted to operate a main slide valve 30 and an auxiliary slide valve 31 contained in a valve chamber 32. The piston chamber 26 is connected to the valve chamber 32 through a passage 33, past a ball check valve 34 and through a passage 35. The valve chamber 32 and the quick action reservoir 9 are connected through a passage 36.

The emergency valve device also comprises a stop member 37 which is subject to the pressure of a coil spring 38 and which is adapted to oppose outward movement of the emergency piston 28 beyond service position.

The vent valve device 7 comprises a cage member 39 which is mounted in the pipe bracket 11 and has a cylinder portion 40 in which is mounted a quick action piston 41 adapted to control the operation of a vent valve 42 contained in a valve chamber 43 which is open to the passage 13 leading from the brake pipe 2. The pressure of a coil spring 44 contained in the valve chamber 43 normally maintains the valve 42 seated and also yieldably resists inward movement of the quick action piston 41 and valve 42.

At one side of the quick action piston 41 there is a chamber 45 which is connected to the seat of the slide valve 30 of the emergency valve device through a passage 46 and at the other side of the piston there is a chamber 47 which is open to the atmosphere through a passage 48. The chamber 45 is open to the chamber 47 and consequently to the atmosphere through a small port 49 in the quick action piston 41.

In operation, when the brake pipe is being initially charged with fluid under pressure, the triple valve piston 15 and associated slide valves 18 and 19 are moved to either full release position as shown in Fig. 1, or to retarded release position as shown in Fig. 2. With the triple valve parts in full release position, fluid under pressure from the piston chamber 12, as supplied from the brake pipe, flows to the auxiliary reservoir by way of a feed passage 50 around the piston 15, valve chamber 16 and passage and pipe 17.

From the valve chamber 16, fluid under pressure flows at a restricted rate to the emergency reservoir 10 through a restricted port 51 in the main slide valve 18 and passages 52 and 53.

The passage 14 which leads from the brake pipe 2 has a choke plug 54 interposed therein and leads to the under side of ball check valves 55 and 56 which are arranged in series, the ball check valve 56 being forced to its seat by the pressure of a coil spring 57 contained in the check valve chamber 58. The valve chamber 58 is connected to the emergency reservoir by way of a passage 59 and passages 52 and 53.

The pressure of the spring 57 on the ball check valve 56 is such that when the brake pipe pressure has been increased to a predetermined degree, say for instance to twenty pounds, the ball check valve 56 will be moved upwardly by brake pipe pressure to its unseated position, so that fluid under pressure supplied to the passage 14 from the brake pipe 2 will flow to the emergency reservoir at a rate governed by flow through the choke plug 54.

Now when the pressure of fluid in the check valve chamber 58, together with the pressure of the spring 57, acting on the upper side of the ball check valve 56, is slightly greater than the brake pipe pressure acting on the under side of the check valve, the spring 57 will cause the check valve to seat, thus closing off the further flow of fluid from the brake pipe passage 14 to the emergency reservoir 10 by way of the passage 59.

It will thus be seen that the ball check valve 56 will be seated before the emergency reservoir is fully charged and that after this valve is seated, the emergency reservoir will be fully charged through the restricted port 51 in the main slide valve 18.

By restricting the flow of fluid to the emergency reservoir through the port 51 and by delaying the more rapid flow of fluid thereto until the brake pipe pressure has been increased to a predetermined degree, the brake pipe pressure, throughout the length of the train, is increased more rapidly than would be the case if the flow of fluid to the emergency reservoir were at the same rate as the flow of fluid to the auxiliary reservoir 3, thus reducing, to a minimum, the time required to charge the equipment to a degree sufficient to make an application of the brakes.

On the cars at the head end of the train where the increase in brake pipe pressure is rapid, the triple valve piston and associated slide valves 18 and 19 will be moved to retarded release position as shown in Fig. 2, against the opposing pressure of the spring-pressed stop 21. With the piston 15 in this position, the flow of fluid from the piston chamber 12 to the valve chamber 16 and auxiliary reservoir 3 is by way of the passage 50 which is restricted by the piston and a restricted passage 60. By thus restricting the rate of flow of fluid from the brake pipe to the auxiliary reservoir, the rate of increase in brake pipe pressure toward the rear end of the train is increased. Further, with the triple valve parts in retarded release position, the emergency reservoir 10 is charged with fluid under pressure in the same manner as when the triple valve parts are in full release position.

On the cars at the rear end of the train where the pressure differential on the triple valve piston 15 is not great enough to overcome the pressure of the spring 23, the triple valve parts will remain in full release position.

Further, in initially charging the equipment, fluid under pressure supplied to the brake pipe flows to the emergency piston chamber 26 through passages 14, 13 and 27 and causes the emergency piston 28 to assume its inner position as shown in Fig. 1, in which position the piston uncovers the passage 33, so that fluid under pressure flows from the chamber 26 to the quick action reservoir 9 through passage 33, past the ball check valve 34, through passage 35, emergency valve chamber 32 and passage 36.

Upon a reduction in brake pipe pressure to effect an application of the brakes, the triple valve piston 15 moves outwardly at a slight differential between the auxiliary reservoir and the brake pipe from full release position, so as to close the feed passage 50 and prevent back flow of fluid from the auxiliary reservoir to the brake pipe.

The piston 15 moves the graduating valve 19 relatively to the main slide valve 18, covering the port 51 and uncovering a service port 61 in the main slide valve 18. Further outward movement of the piston is then resisted by the pressure of the spring 25 acting through the medium of the movable stop 24, but when the brake pipe pressure is reduced a predetermined but light amount, for example, a reduction of one pound or less, the spring 25 is of such a value that its resistance is overcome, permitting the piston to move the graduating valve 19 to an initial quick service position without moving the main slide valve 18 from its full release position.

In this position, a cavity 62 in the graduating slide valve 19 connects a port 63 in the main slide valve 18 with a port 64 also in the main slide valve.

With the main slide valve 18 in release position, the port 63 registers with a passage 65 to which the brake pipe passage 14 is connected past a ball check valve 66. The port 64 registers with a passage 67 which is connected to a passage 68 leading to the quick service chamber 4.

With the brake pipe 2 thus connected to the chamber 4, fluid under pressure is vented from the brake pipe to the chamber so as to produce a sharp and definite local reduction in brake pipe pressure before the triple valve parts move to service application position. This local reduction is rapidly transmitted to the next car of the train, causing the triple valve on said next car to act in a similar manner, and so on throughout the length of the train. As a consequence, quick serial action takes place on each car in advance of the application of the brakes on that car. It will here be noted that, in the present embodiment of the invention, the brake pipe 2 is directly connected to the passage 14 and that the triple valve piston chamber 12 is indirectly connected to the passage 14 through the passage 13, so that the local reduction in brake pipe pressure is first effective in the brake pipe and then in the piston chamber. By this arrangement, the beginning of the local reduction caused by the triple valve parts on the first car of the train moving to quick service position, is rapidly transmitted to the next car before the local reduction is sufficient to cause the triple valve parts to move outwardly to service position, thus quick service action is rapidly propagated throughout the length of the train.

Following the above described quick service venting of fluid from the brake pipe, the triple valve piston 15 and main side valve 18 are positively moved to service application position on each car, in which position, as shown in Fig. 3 of the drawings, the port 61 in the main slide valve, which port has been uncovered by the graduating slide valve 19 in its initial movement toward service application position, registers with a passage 69 which is open to a passage 70 leading to the brake cylinder, so that fluid under pressure is supplied from the auxiliary reservoir 3 to the brake cylinder 8 to effect a service application of the brakes in the usual well known manner.

The main slide valve 18 is provided with a cavity 71 which is open to the face of the valve through ports 72, 73 and 74. Between the ports 73 and 74 there is interposed in the cavity 71 a restriction 75.

The movement of the main side valve 18 toward service position operates to cut off communication between the passages 65 and 67 by way of ports 63 and 64 in the main slide valve 18 and connecting cavity 62 in the graduating slide valve 19, and further operates to establish communication between these passages 65 and 67 through the ports 73 and 74 and restricted portion of the cavity 71, the port 73 registering with the passage 65 and the port 74 registering with the passage 67, so that fluid under pressure is now vented from the brake pipe to the chamber 4 at a restricted rate.

With the main slide valve 18 in application position, the port 72 therein registers with a passage 76 leading to the chamber 5, so that a further venting of fluid from the brake pipe takes place. If the main slide valve 18 should be moved to application position so quickly that the quick service reduction in brake pipe pressure is not sufficient to propagate quick service action to the next car in the train, the reduction of brake pipe pressure into the chamber 5 will be sufficient to propagate quick service action to said next car.

It has been found that the initial quick service venting, as well as the final quick service venting into the chamber 5, causes surges to be created in the fluid remaining in the brake pipe, which surges tend to return the triple valve piston 15 to release position. By continuing to reduce the brake pipe pressure into the chamber 4 for a period of time after the triple valve parts are in application position, the increase in the pressure of fluid in the piston chamber 12 due to these surges will not be great enough to effect the movement of the piston 15 toward release position.

When the auxiliary reservoir pressure has been reduced by flow to the brake cylinder to a degree slightly less than the reduced brake pipe pressure, the piston 15 moves the graduating valve 19 back to service lap position, in which the supply of fluid to the brake cylinder is cut off.

With the triple valve parts in service lap position, the chambers 4 and 5 are maintained connected to the brake pipe and are consequently charged with fluid under pressure.

Upon a further reduction in brake pipe pressure, the piston 15 moves from lap to full service position, shifting the graduating slide valve 19 relatively to the main slide valve 18, which slide valve 18 is in service position. As the slide valve 19 is thus shifted it uncovers port 61 in the main slide valve, and since this port registers with the passage 69, fluid under pressure is now supplied from the auxiliary reservoir to the brake cylinder.

Since the chambers 4 and 5 are charged with fluid under pressure from the brake pipe, no local venting of fluid from the brake pipe to these chambers takes place when the triple valve parts move from service lap to service position, thus effectively preventing harsh braking action throughout the train upon a reapplication of the brakes.

Upon increasing the brake pipe pressure to effect the release of the brakes, the triple valve piston 15 is operated to shift the graduating slide valve 19 and the main slide 18 back to release position, as shown in Fig. 1. With the triple valve parts in this position, fluid under pressure is released from the brake cylinder 8 by way of pipe and passage 70, passage 69, a cavity 77 in the main slide valve 18, a passage 78 and a passage 79. Fluid under pressure from the chamber 4 is discharged to the atmosphere by way of passage 68, a passage 80, and the cavity 77 in the main slide valve, and fluid under pressure is also discharged from the chamber 5 through passage 76 and the cavity 77.

With the triple valve parts in retarded release position, as shown in Fig. 2 of the drawings, the main slide valve 18 covers the unrestricted release passage 78, so that the release of fluid under pressure from the brake cylinder and from the chambers 4 and 5 is by way of the cavity 77 in the main slide valve, a passage 81, a choke plug 82 and passage 79.

With the triple valve parts in either full or retarded release position, fluid under pressure from the emergency reservoir flows to the auxiliary reservoir through the restricted port 51 in the main slide valve 18 and thus assists in recharging the auxiliary reservoir. Since the pressure of fluid in the emergency reservoir is not reduced in effecting a service application of the brakes, the auxiliary reservoir will be recharged from the emergency reservoir to within a few pounds of the normal brake pipe pressure, so that fluid under pressure does not flow to the auxiliary reservoir until the brake pipe is nearly fully charged, thus providing for a rapid build up of brake pipe pressure toward the rear of the train. The final recharge of the auxiliary reservoir is by way of the feed passage 59 when the triple valve parts are in full release position and by way of the feed passage 58 and feed groove 60 when the triple valve parts are in retarded release position.

In either the full or retarded release position of the triple valve parts, the final recharge of the emergency reservoir is by way of the restricted port 51 in the main slide valve 18.

In Fig. 4 of the drawings, a modification of the invention is illustrated in which the feed groove 69 is omitted and a cavity 83 is provided in the main slide valve, which cavity is connected to the restricted port 51 through a port 84 of small diameter. With the triple valve parts in retarded release position, the cavity 83 registers with the passage 52, so that fluid under pressure flows from the emergency reservoir to the auxiliary reservoir through the small port 84 and restricted port 51, the rate of recharge being substantially the same as when the feed groove 61 is provided.

In this modification the spring 57 which, in the equipment shown in Fig. 1, tends to maintain the ball check valve 56 seated, is omitted, so that when the pressure of fluid in the brake pipe is higher than that of the emergency reservoir in charging the equipment, the emergency reservoir is fully charged directly from the brake pipe.

The operation of the emergency valve device 6 and vent valve device 7 is substantially the same as that described in an application filed March 28, 1931, and serially numbered 526,015, and since these valve devices do not enter into the combinations hereinafter claimed, a detailed description of the operation of said devices is deemed unnecessary.

While two illustrative embodiments of our invention have been described in detail, it is not our intention to limit its scope to these embodiments or otherwise than by the terms of the appended claims.

Having now described our invention, what we claim as new and desire to secure by Letters Patent, is:

1. In a fluid pressure brake equipment, the combination with a brake pipe, a brake cylinder, an auxiliary reservoir and another reservoir, of valve means, a piston operated upon an increase in brake pipe pressure to establish a communication through which fluid under pressure flows from the brake pipe to the auxiliary reservoir and to actuate said valve means to connect the brake cylinder to the atmosphere and to establish communication through which fluid under pressure is adapted to flow from the auxiliary reservoir to said other reservoir at one time and through which fluid under pressure is adapted to flow from said other reservoir to the auxiliary reservoir at another time, a communication through which fluid under pressure is adapted to flow from the brake pipe to said other reservoir independently of the operation of said piston and valve means, and means interposed in the last mentioned communication preventing back flow of fluid under pressure from said other reservoir to the brake pipe.

2. In a fluid pressure brake, the combination with a brake pipe, an auxiliary reservoir and an additional reservoir, of valve means operated upon an increase in brake pipe pressure for supplying fluid under pressure from the brake pipe to the auxiliary reservoir and from the auxiliary reservoir to said additional reservoir, and means operated only upon a predetermined material increase in brake pipe pressure for supplying fluid under pressure directly from the brake pipe to said additional reservoir, said means comprising a valve and a spring for opposing the opening movement of the valve.

3. In a fluid pressure brake equipment, the combination with a brake pipe, a brake cylinder, an auxiliary reservoir and another reservoir, of valve means operated upon an increase in brake pipe pressure to connect the brake cylinder to the atmosphere, to establish communication from one of said reservoirs to the other and to establish a communication separate from the first mentioned communication through which fluid under pressure is supplied from the brake pipe to the auxiliary reservoir, a communication through which fluid under pressure flows from the brake pipe directly to said other reservoir, and means interposed in the last mentioned communication operated only upon an increase in brake pipe pressure above that required to effect the operation of said valve means, to supply fluid under pressure through the last mentioned communication from the brake pipe to said other reservoir.

4. In a fluid pressure brake equipment, the combination with a brake pipe, a brake cylinder, an auxiliary reservoir and another reservoir, of valve means operated upon an increase in brake pipe pressure to connect the brake cylinder to the atmosphere, to establish communication from one of said reservoirs to the other and to establish a communication separate from the first mentioned communication through which fluid under pressure is supplied from the brake pipe to the auxiliary reservoir, a communication through which fluid under pressure flows from the brake pipe directly to said other reservoir, and means interposed in the last mentioned communication operated only upon an increase in brake pipe pressure above that normally required to effect the operation of said valve means, to supply fluid under pressure from the brake pipe to said other reservoir and operated when the pressure of fluid in said other reservoir is increased to a predetermined degree to close off the further flow of fluid throughout the last mentioned communication to said other reservoir.

5. In a fluid pressure brake equipment, the combination with a brake pipe, a brake cylinder, an auxiliary reservoir and another reservoir, of valve means operated upon an increase in brake pipe pressure to connect the brake cylinder to the atmosphere, to establish communication from one of said reservoirs to the other and to establish a communication separate from the first mentioned communication through which fluid under pressure is supplied from the brake pipe to the auxiliary reservoir, a communication through which fluid under pressure flows from the brake pipe directly to said other reservoir, and means interposed in the last mentioned communication operated only upon an increase in brake pipe pressure above that normally required to effect the operation of said valve means, to supply fluid under pressure from the brake pipe to said other reservoir and operated when the pressure of fluid in said other reservoir is increased to a predetermined degree to close off the further flow of fluid through the last mentioned communication to said other reservoir, said other reservoir being finally fully charged with fluid under pressure flowing from the brake pipe through the communications established by said valve means.

6. In a fluid pressure brake equipment, the combination with a brake pipe, a brake cylinder, an auxiliary reservoir and another reservoir, of valve means operated upon an increase in brake pipe pressure to connect the brake cylinder to the atmosphere, to establish communication from one of said reservoirs to the other and to establish a communication separate from the first mentioned communication through which fluid under pressure is supplied from the brake pipe to the auxiliary reservoir, a communication through which fluid under pressure flows from the brake pipe directly to said other reservoir, and means interposed in the last mentioned communication operated only upon an increase in brake pipe pressure above the pressure normally required to effect the operation of said valve means, to supply fluid under pressure from the brake pipe to said other reservoir.

7. In a fluid pressure brake equipment, the combination with a brake pipe, two chambers and a triple valve device comprising valve means and a piston operated upon a reduction in brake pipe pressure for operating said valve means to effect an application of the brakes, means operative upon movement of the valve means toward application position for venting fluid under pressure from the brake pipe to one of said chambers, means operative upon the movement of said valve means to application position for venting fluid under pressure from the brake pipe to both of said chambers, and means for retarding the rate of flow of fluid to one of said chambers when the brake pipe is connected to both chambers.

8. In a fluid pressure brake equipment, the combination with a brake pipe, two chambers and a triple valve device comprising valve means and a piston operated upon a reduction in brake pipe pressure for operating said valve means to effect an application of the brakes, means operative upon movement of the valve means toward application position for venting fluid under pressure from the brake pipe to one of said chambers, and means operative upon movement of the valve means to application position for venting fluid under pressure from the brake pipe to one of said chambers at a restricted rate and to the other of said chambers at a faster rate.

9. In a fluid pressure brake, the combination with a brake pipe, an auxiliary reservoir and an additional reservoir, of a triple valve device operated upon an increase in brake pipe pressure for supplying fluid under pressure from the brake pipe to said auxiliary reservoir and from the auxiliary reservoir to said additional reservoir, a communication through which fluid under pressure is adapted to be supplied from the brake pipe to said additional reservoir independently of said triple valve device, and means for maintaining said communication closed until a predetermined material increase in brake pipe pressure has been effected, said means comprising a valve and a spring opposing the opening movement of the valve.

10. In a fluid pressure brake, the combination with a brake pipe, an auxiliary reservoir and an additional reservoir, of a triple valve device operated upon an increase in brake pipe pressure for supplying fluid under pressure from the brake pipe to said auxiliary reservoir and from the auxiliary reservoir to said additional reservoir, a communication through which fluid under pressure is adapted to be supplied from the brake pipe to said additional reservoir, and means for maintaining said communication closed until a predetermined material increase in brake pipe pressure has been effected, said means comprising a valve and a spring opposing the opening movement of the valve.

11. In a fluid pressure brake, the combination with a brake pipe, an auxiliary reservoir and an additional reservoir, of valve means operated upon an increase in brake pipe pressure for supplying fluid under pressure from the brake pipe to the auxiliary reservoir and from the auxiliary reservoir to the additional reservoir, a spring, means subject on one side to the pressures of the additional reservoir and the spring and on the other side to the pressure of the brake pipe and operated, only upon an increase in brake pipe pressure above that normally required to cause the operation of said valve means, for supplying fluid under pressure directly from the brake pipe to the additional reservoir.

12. In a fluid pressure brake, the combination with a brake pipe, an auxiliary reservoir and an additional reservoir, of a triple valve device operated upon an increase in brake pipe pressure for supplying fluid under pressure from the brake pipe to said auxiliary reservoir and from the auxiliary reservoir to said additional reservoir, a communication through which fluid under pressure is adapted to be supplied from the brake pipe to said additional reservoir independently of said triple valve device, and means for maintaining said communication closed until after the brake pipe pressure has been increased above that normally required to effect the operation of said triple valve device.

13. In a fluid pressure brake, the combination with a brake pipe, an auxiliary reservoir and an additional reservoir, of a triple valve device operated upon an increase in brake pipe pressure for supplying fluid under pressure from the brake pipe to said auxiliary reservoir and from the auxiliary reservoir to said additional reservoir, a communication through which fluid under pressure is adapted to be supplied from the brake pipe to said additional reservoir, and means for maintaining said communication closed until after the brake pipe pressure has been increased above that normally required to effect the operation of said triple valve device.

14. In a fluid pressure brake, the combination with a brake pipe, an auxiliary reservoir and an additional reservoir, of valve means operated upon an increase in brake pipe pressure for supplying fluid under pressure from the brake pipe to the auxiliary reservoir and from the auxiliary reservoir to a passage leading to and in constant open communication with said additional reservoir, a communication leading from the brake pipe to said passage and by-passing said valve means, through which communication, fluid under pressure is adapted to flow from the brake pipe to said passage, and valve means normally closing said communication and operable to open the communication when the brake pipe pressure has been increased above that normally required to effect the operation of said valve means.

15. In a fluid pressure brake equipment, the combination with a brake pipe, a brake cylinder, an auxiliary reservoir and another reservoir, a passage in constant open communication with said other reservoir, of valve means, a piston operated upon an increase in brake pipe pressure to establish a communication through which fluid under pressure flows from the brake pipe to the auxiliary reservoir and to actuate said valve means to connect the brake cylinder to the atmosphere and to establish communication between the auxiliary reservoir and said passage, a communication through which fluid under pressure is adapted to flow from the brake pipe to said passage and therethrough to said other reservoir independently of the operation of said piston and valve means, and means interposed in the last mentioned communication for delaying the flow of fluid from the brake pipe to said additional reservoir until the brake pipe pressure has been increased above that normally required to effect the operation of said piston.

CLYDE C. FARMER.
ELLIS E. HEWITT.